(12) United States Patent
Gierss

(10) Patent No.: US 7,219,765 B2
(45) Date of Patent: May 22, 2007

(54) DEVICE FOR THE ARRANGEMENT OF A PERSONNEL-OPERATED APPARATUS IN THE CEILING AREA OF A STAGE OR AN AUDITORIUM

(76) Inventor: Karsten Gierss, Fritzstrasse 1, Fellbach (DE)

( * ) Notice: Subject to any disclaimer, the term of this patent is extended or adjusted under 35 U.S.C. 154(b) by 239 days.

(21) Appl. No.: 10/900,973

(22) Filed: Jul. 28, 2004

(65) Prior Publication Data
US 2005/0204669 A1    Sep. 22, 2005

(30) Foreign Application Priority Data
Feb. 12, 2004    (DE) ................ 20 2004 002 595 U

(51) Int. Cl.
*E04G 3/00*    (2006.01)
(52) U.S. Cl. ...................... 182/150; 182/152
(58) Field of Classification Search ............... 182/150, 182/113, 152, 142
See application file for complete search history.

(56) References Cited

U.S. PATENT DOCUMENTS

| 470,689 | A | * | 3/1892 | Lee ............................. 182/113 |
| 2,070,334 | A | * | 2/1937 | Garber ....................... 362/253 |
| 3,463,265 | A | * | 8/1969 | Clover ......................... 182/17 |
| 4,134,474 | A | * | 1/1979 | Stavenau et al. ........... 182/187 |
| 4,437,546 | A | * | 3/1984 | Marinoff et al. ............ 182/233 |
| 5,394,956 | A | * | 3/1995 | Hulse .......................... 182/142 |
| 5,988,317 | A | * | 11/1999 | Riding ........................ 182/152 |
| 6,431,314 | B1 | | 8/2002 | Boulanger et al. |
| 6,505,707 | B1 | * | 1/2003 | Berry .......................... 182/20 |
| 6,675,934 | B1 | * | 1/2004 | McCormick ................ 182/129 |
| 2002/0157899 | A1 | * | 10/2002 | Smith ........................ 182/63.1 |

FOREIGN PATENT DOCUMENTS

| DE | 8 13 451 C | 9/1951 |
| DE | 72 15 779 U | 7/1972 |
| DE | 4422779 | 2/1995 |
| DE | 202 08947 U1 | 11/2002 |
| DE | 10122809 | 11/2002 |
| EP | 1 300 529 A1 | 4/2003 |
| FR | 2442940 | 6/1980 |

OTHER PUBLICATIONS

Austrian Search Report dated Apr. 13, 2005 (4 pages).

* cited by examiner

*Primary Examiner*—Alvin Chin-Shue
(74) *Attorney, Agent, or Firm*—Flynn, Thiel, Boutell & Tanis, P.C.

(57) ABSTRACT

A work platform for a lighting operator or a cameraman is described, which has a mounting for the apparatus to be operated and a seat for the operator. The work platform consists thereby of foldable sidewalls, which in a transport position lie parallel with the floor and receive frame parts below themselves, which serve to complete the entire work platform.

6 Claims, 6 Drawing Sheets

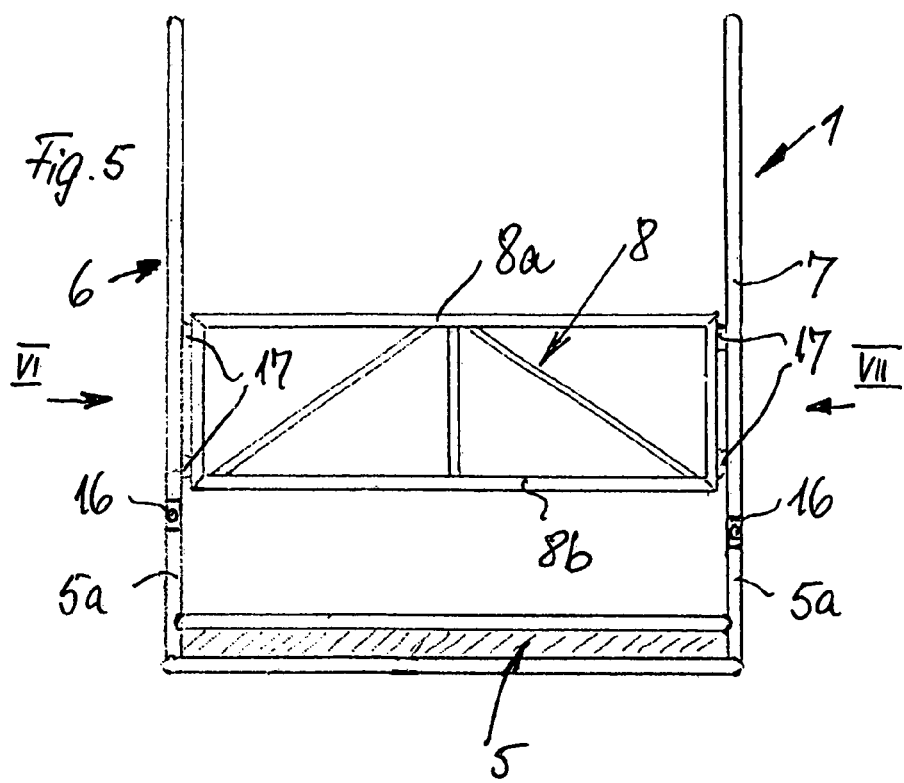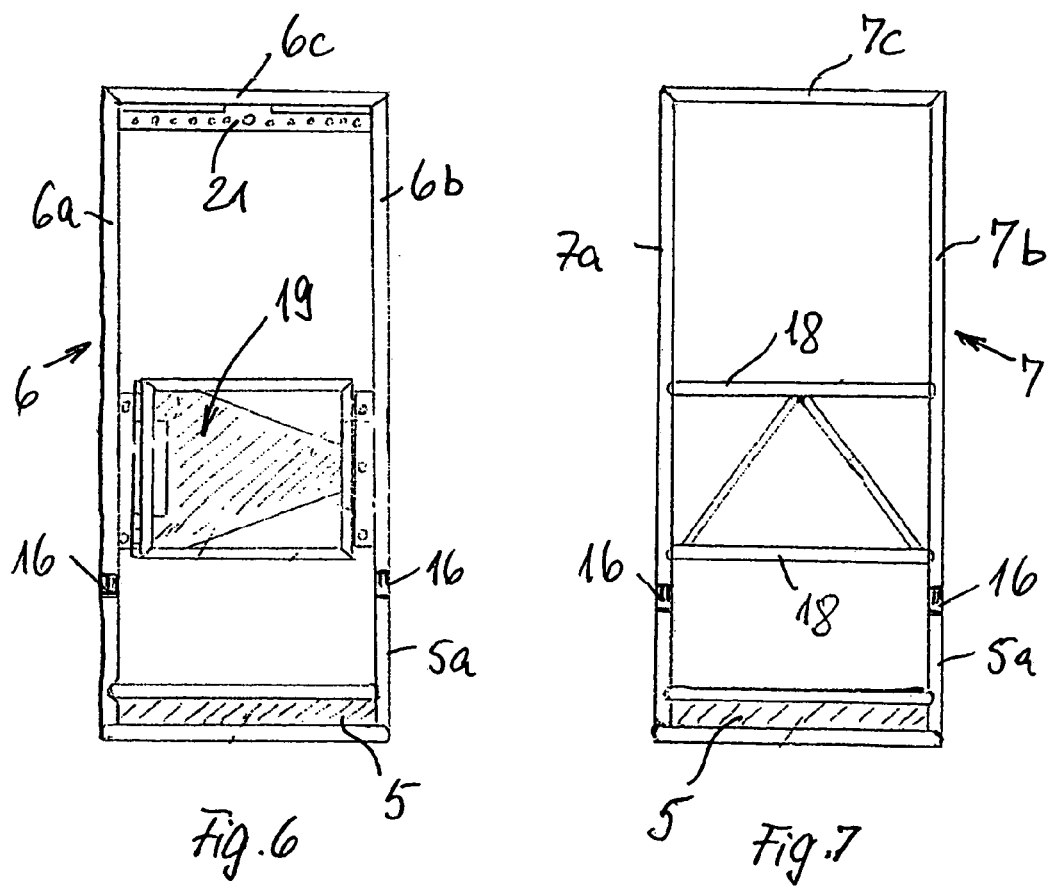

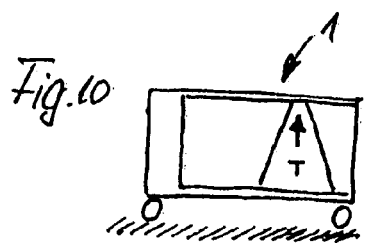
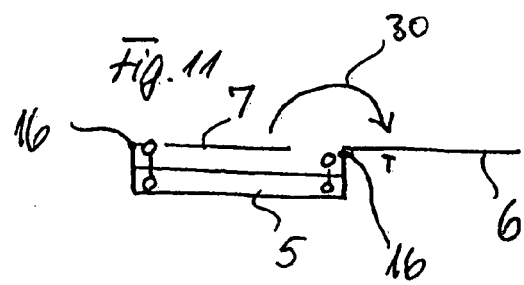
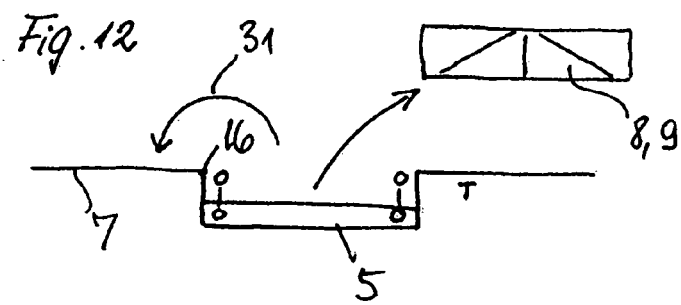
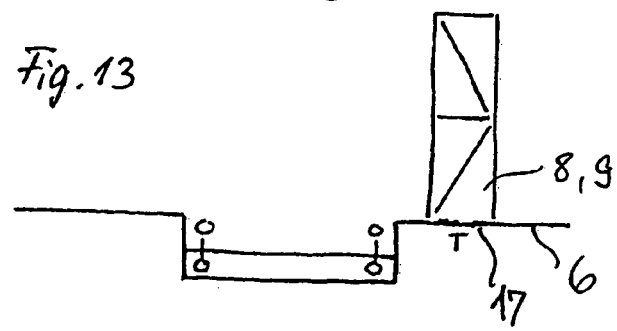
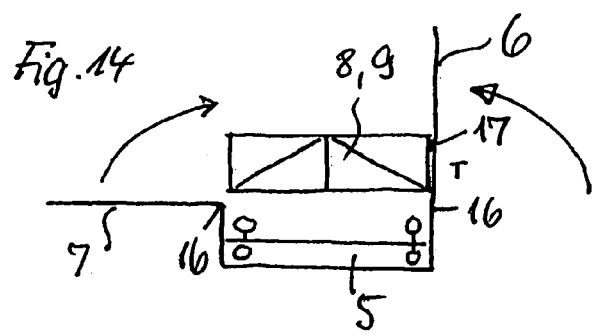
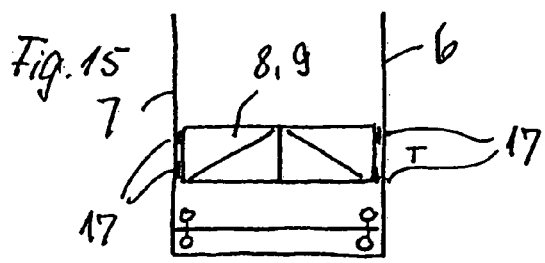

DEVICE FOR THE ARRANGEMENT OF A PERSONNEL-OPERATED APPARATUS IN THE CEILING AREA OF A STAGE OR AN AUDITORIUM

FIELD OF THE INVENTION

The invention relates to a device for the arrangement of a personnel-operated apparatus, in particular a camera or spot lighting on a traverse extending in the ceiling area of a stage or of the auditorium, comprising a seat for the operator and a mounting for the apparatus.

BACKGROUND OF THE INVENTION

It is known for television recordings to provide a spot lighting device in the area above the audience, which lighting device can be guided and aligned in spots point-by-point by an operator. The operator sits thereby on a seat, with which is associated a mounting for the lighting apparatus and which is secured with same on a traverse. In the case of these devices, the person secured on the mounting can almost not move and cannot leave the workstation.

SUMMARY OF THE INVENTION

The basic purpose of the present invention is to significantly improve this situation. The invention consists in a device of the above-identified type with the seat and the mounting being mounted on a work platform, which has a protective railing all around it, and which can be connected to the traverse.

The operator has with this design significant freedom to move. A special lock on the mounting is no longer needed.

The protective railing can in an advantageous development of the invention consist of four side parts, which extend perpendicularly to one another, and of which at least two oppositely positioned side parts are arranged each foldably at 180° with respect to the floor part of the work platform and are securable on the traverse after the work platform has been assembled. This development makes it possible to arrange the foldable side parts in a transport position one above the other and parallel to the floor part of the work platform. The new work platform can therefore when not in use or during transport be folded compactly, whereby the nonfoldable side parts are designed as frames in an advantageous manner and can be held in transport position under the side parts, which are folded on one another.

It is thereby very advantageous for the installation of the new work platform that the foldable side parts can be folded from the transport position approximately 180° outwardly, after which both side parts, which are designed as frames, are each mounted and secured vertically on each securing point of an outer support of one of the unfolded side parts, after which then both side parts are again folded back at 90° and the two frames, which are already secured on one of the foldable side parts, are now fixedly connected to the second foldable side part, which can occur in an advantageous manner via snap closures. This development enables a very simple assembly of the work platform from its compact initial position.

When the work platform is mounted in this manner, it is possible that the mounting for the apparatus can be mounted, for example snapped on and secured with snap closures, on one of the side parts designed as a frame. The mounting can thereby be arranged on the outside of the work platform or also on the inside depending on what appears to be particularly advantageous for the special use. The securement of the work platform on the traverse is then different merely because the center of gravity of the work platform with the apparatus is in an advantageous manner supposed to be arranged below the traverse in order to avoid a tilting of the traverse, which is suspended from the ceiling of the room downwardly. Not only a two-point but a three-point suspension is here advantageously chosen for the traverse in order to substantially avoid a tilting and swinging.

The seat for the operator is secured with at least one securing support on a side part designed as a frame. One of the foldable side parts can also have a door for entry by the operator, whereby then a rope ladder and a safety rope, which can be rolled up and is locked with a pawl, is provided on the side of the door for the operator and can be suspended in the area of the sidewall, which area faces the traverse. The operator can then climb onto and leave the work platform from outside.

BRIEF DESCRIPTION OF THE DRAWINGS

The invention is illustrated in the following drawings using exemplary embodiments and will be described hereinafter. In the drawings:

FIG. 5 is the front view of a work platform according to the invention, however, without a mounting for the apparatus and without a seat for the operator, FIG. 6 is the side view of the work platform of FIG. 5 viewed in direction of the arrow VI, FIG. 7 is the side view of the work platform of FIG. 5 viewed in direction of the arrow VII, FIGS. 10 to 19 is the schematic illustration of the individual steps for the erection of the work platform according to the invention from a transport position.

DETAILED DESCRIPTION

Figure 1:
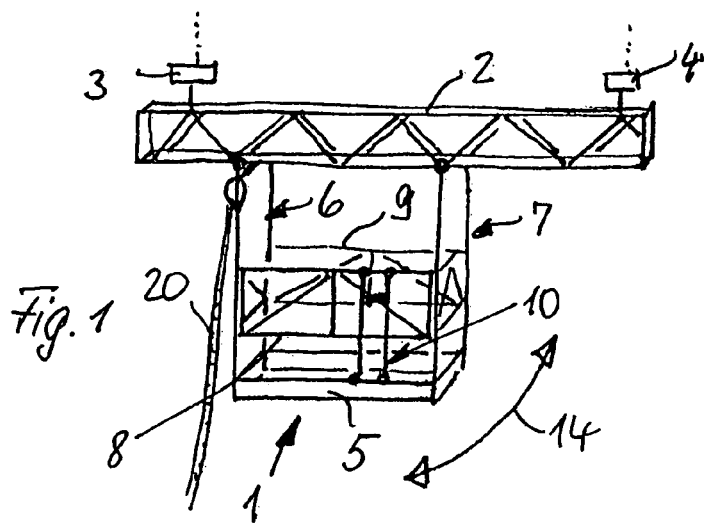
FIG. 1 illustrates a first arrangement of a work platform according to the invention on a traverse.

FIG. 1 shows a work platform 1 according to the invention, which is secured on a traverse, which in turn is suspended at the points 3 and 4 on a ceiling (not illustrated) of a stage or an auditorium. The work platform 1 consists of a floor 5, which is secured on the traverse 2 with the help of the two oppositely lying side parts 6 and 7, whereby the side parts 6 and 7 are connected to one another by frame parts 8 and 9, which together with the side parts 6 and 7 form a continuous protective railing, as will be described in detail later on in connection with FIGS. 5 to 7.

Figure 3:
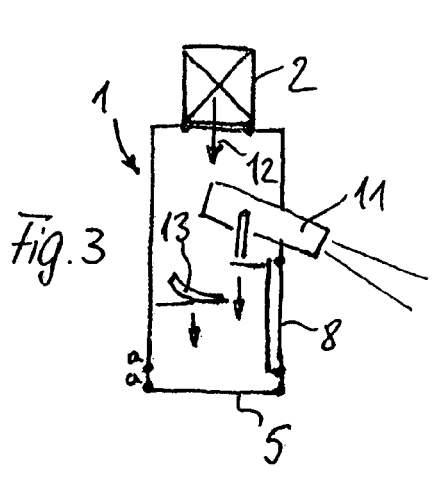
FIG. 3 is a schematic illustration of a view of the work platform according to FIG. 2 in direction of the arrow III.
Figure 4:
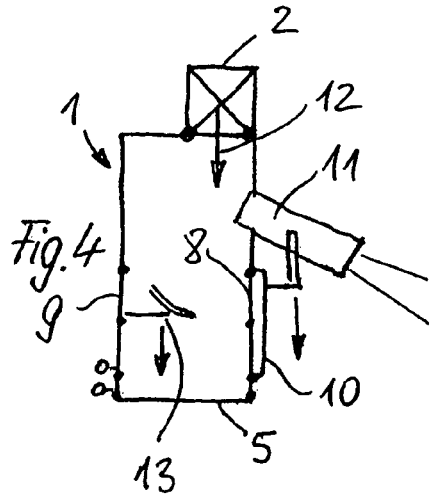
FIG. 4 is a view of the work platform of FIG. 2 in direction of the arrow III, however, with an apparatus (spot), which in contrast to FIG. 2 is not mounted within the work platform but outside of same.

FIGS. 3 and 4 show that a mounting 10 is secured on one of the frame parts 8, as will be described in detail later on in connection with FIG. 8. This mounting 10 carries in the exemplary embodiment an illuminating apparatus 11 (spot), which is used to spotlight the stage or the auditorium. FIGS. 3 and 4 make it clear thereby that the mounting 10, as illustrated in FIG. 3, can be mounted inside of the work platform 1 or, as illustrated in FIG. 4, outside of the work platform 1. In order to keep in this case the total center of gravity of the work platform including the apparatus and the operator as much as possible vertically below the traverse 2, the work platform 1 is connected in each case to the traverse 2 in such a manner that, as indicated with the arrow 12, the total center of gravity of the work platform will lie centrally below the traverse 2. FIGS. 3 and 4 also show a seat arrangement, as will be discussed in detail in connection with FIG. 9. The seat arrangement 13 is, like the mounting 10, secured on the protective railing of the work platform 1, which means in this case on the frame 9.

Figure 2:
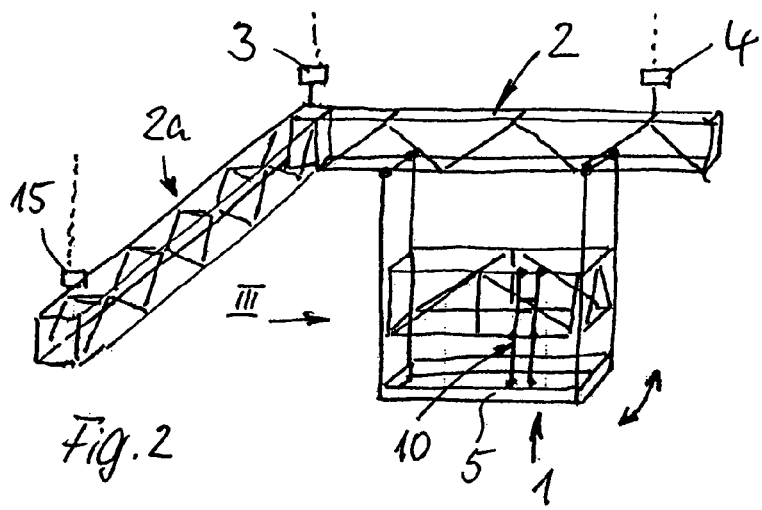
FIG. 2 illustrates the arrangement of the work platform on a traverse with a three-point suspension.

As shown by the arrow 14 in FIG. 1, the arrangement of the work platform 1 on a traverse 2 has the tendency to swing. If this is supposed to be avoided, an arrangement according to FIG. 2 is advisable where the traverse 2 is angularly enlarged by a shoulder 2a and the entire traverse arrangement is suspended besides at the points 3 and 4 also at the point 15. This three-point suspension substantially prevents a swinging of the work platform 1 about the longitudinal axis of the traverse 2.

FIGS. 5 to 7 show that the floor 5 of the work platform 1 is designed as a strong rectangular frame with inserted floor boards, and is connected in each of the areas of the two larger side parts 6 and 7 with upwardly projecting posts 5a to outer supports 6a, 6b or 7a, 7b of the side parts 6 and 7, whereby these outer supports are each connected by cross bracing 6c or 7c to form a U-frame.

The posts 5a of the floor are each connected to the outer supports 6a and 6b or 7a and 7b by joints 16, which, as will be discussed later on, permit a folding of each of the side parts 6 and 7 at 90° toward or away from the floor 5. The side parts 6 and 7 are fixedly connected in their assembly position illustrated in FIG. 5 by the frames 8 and 9, which are each secured at the points 17, for example, through snap closures on the side parts 6 and 7. This frame consists in the exemplary embodiment of two spars 8a and 8b, which extend parallel to one another, and which, as will be later discussed in greater detail, serve at least partly to secure the mounting 10 for the apparatus to be operated. The side parts 6 and 7 themselves have at the level of the frames 8 and 9 cross bracing 18 (side part 7) or a door 19, which permits entry for an operator. As will also be discussed later, the work platform 1 has a rope ladder 20 and a safety rope for entry of an operator, which ladder or rope can be inserted at the top of the side part 6 into a securing bar 21 arranged below the cross bracing 6c.

Figure 8:
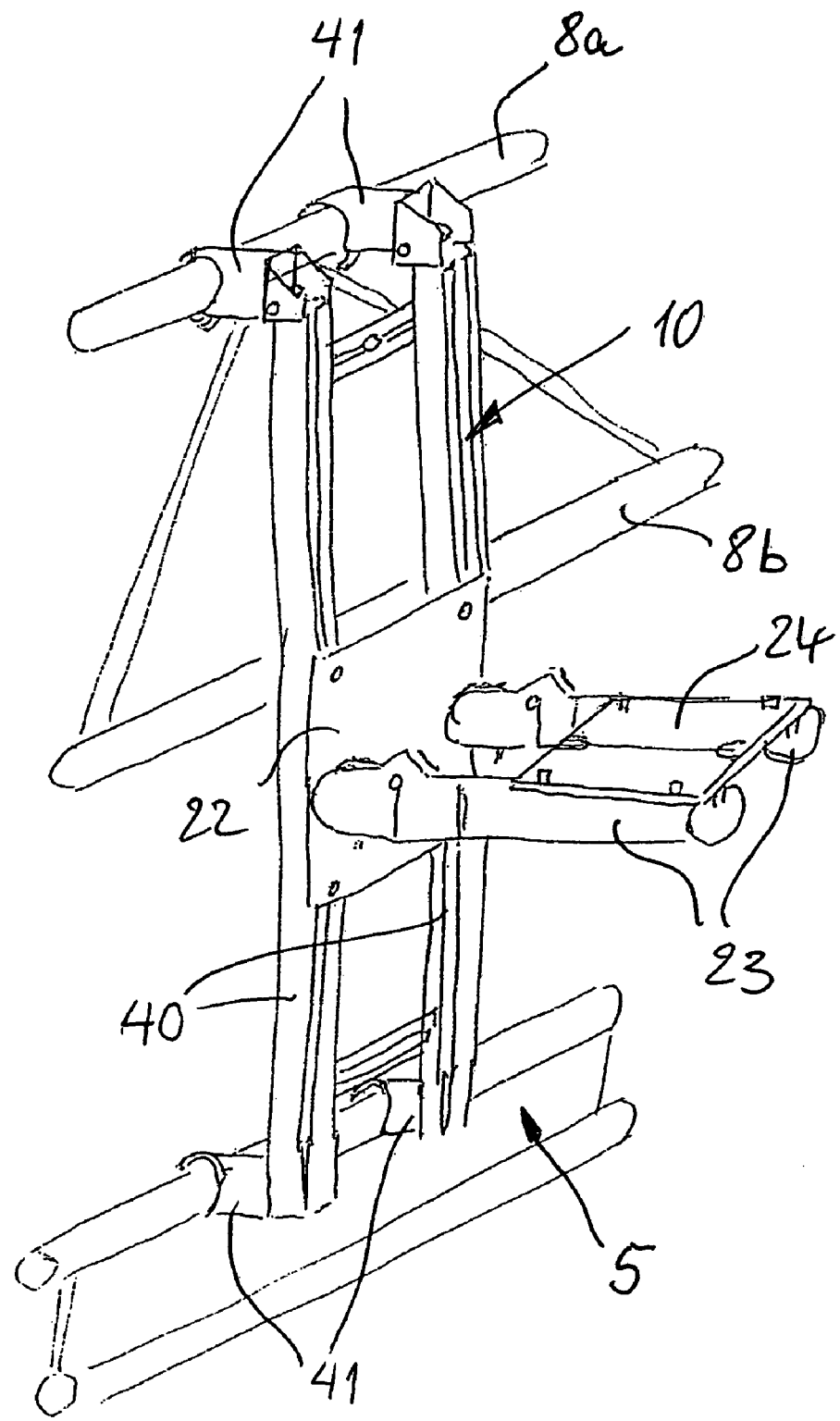
FIG. 8 is a perspective illustration of the mounting for the apparatus to be secured.

FIG. 8 shows that the mounting 10 for the spot-lighting or also for a camera is assembled from two approximately parallel extending arms 40, which each have clamps 41 at each of the two ends, which clamps can be secured like snap closures at the upper transverse arms 8a of the frame 8 and at the upper cross bracing of the floor 5. The two arms 40 are connected by a board 22, on which in turn are assembled support arms 23 with an overlay and securing option in the form of a board 24 for the apparatus to be operated, thus for a spot-light or also a camera.

Figure 9:
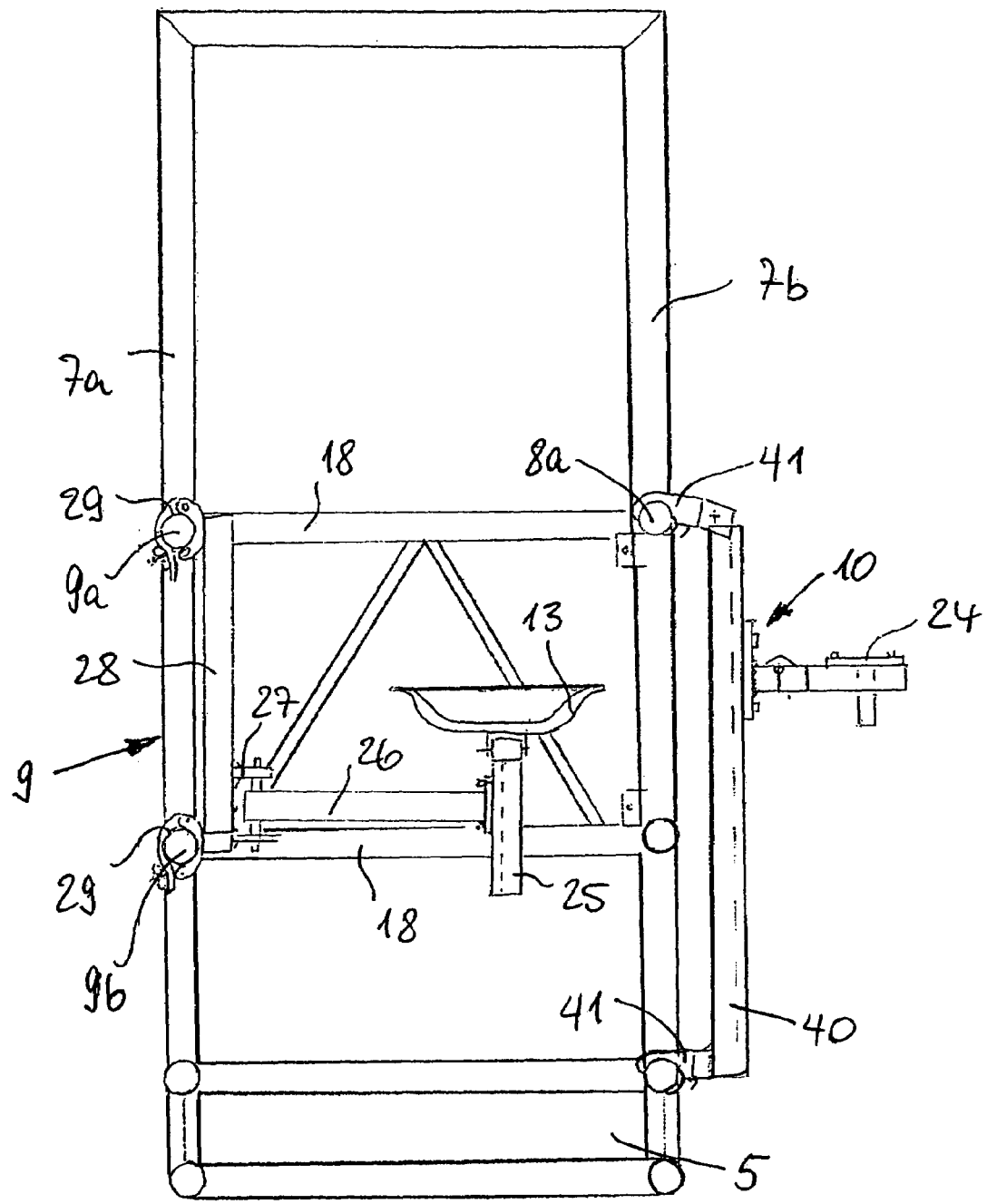
FIG. 9 is a cross-sectional view of the work platform of FIG. 6 in an illustration similar to FIG. 4 with attached mounting for an apparatus and a built-in seat for the operator.

FIG. 9 shows the mounting and securing means for the seat 13. Same is held on a swivel arm 26 through a shaft 25 adjustable in height, which swivel arm 26 in turn is arranged on a holder 28 through a hinge 27, which holder has collar bands 29 at its two ends, which collar bands are clamped to the upper crossarm 9a and the lower crossarm 9b of the frame 9. Of course securement could also be carried out in a different manner on cross-supports, for example of the floor and of the frame 9, if this appears to be advantageous.

FIGS. 10 to 19 serve as an explanation of the assembly of a work platform according to the invention, which is designed such that it can be transported or stored in a very compact state, and can then be assembled in a simple and quick manner into a finished platform.

FIG. 10 shows the work platform in the transport position, where it is moved, for example, on a movable base to its place of use. FIG. 11 shows that after placing of the floor 5 first the side part 6 is folded about its hinge 16 at 180° in the direction of the arrow 30 from the initial position extending parallel to the floor into the position illustrated in FIG. 11, that then according to FIG. 12 the side part 7 is also folded at 180° in the direction of the arrow 31 into the illustrated position after which the two frames 8 and 9 stored below the side parts 6 and 7 can be removed. According to FIG. 13 these frames are then placed vertically onto the two outer supports 6a and 6b of the side part 6 and are fixedly connected to these at the securing points 17. After this has taken place, the side part 6 is swung back at 90° about its hinge 16, and the side part 7 is also according to FIG. 14 swung upwardly at 90° so that the frames 8 and 9 can then also be fixedly connected with the two outer supports 7a, 7b of the side part 7 on the securing points 17. The basic assembly of the work platform 1 has thus been carried out.

Figure 16:
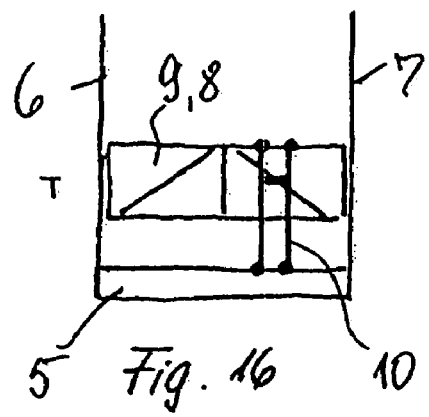
Figure 17:
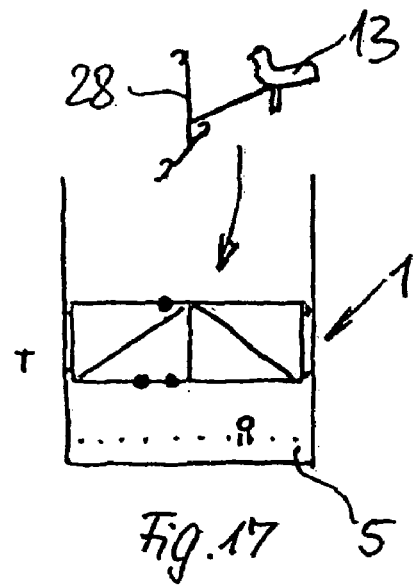
Figure 18:
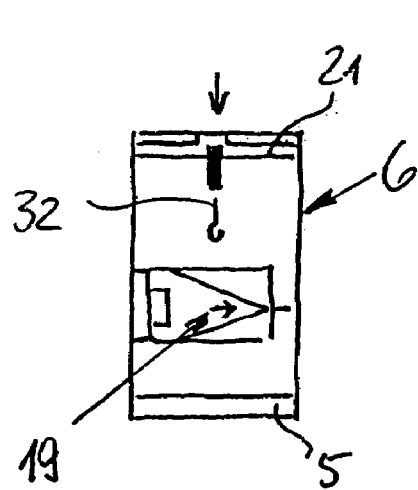
Figure 19:
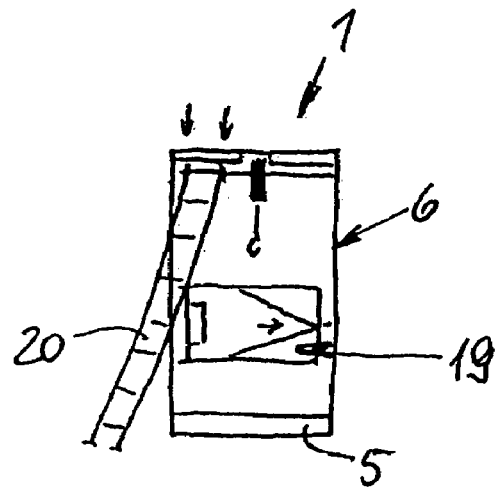

According to FIGS. 16 and 17 the mounting 10 in the manner discussed in connection with FIG. 8 and the seat 13 with its securing arm 28 are inserted one after the other. According to FIGS. 18 and 19 the securing bar 21 is then secured with the safety rope 32 at the top on the side part 6 and the rope ladder 20 is hung last so that the work platform is complete. The door 19 has been inserted just like the protective gate connection of the cross bracing 18 already after the basic assembly of the work platform according to FIG. 15. The new work platform therefore offers on the one hand a significantly greater comfort for the operator. It can be assembled in a simple manner and does not require much space for storage or for transport.

The invention claimed is:

1. A device for the arrangement of a personnel-operated apparatus on a traverse extending in the ceiling area of a stage or auditorium, comprising a seat for the operator and a mounting for the apparatus, wherein the seat and the mounting are mounted on a work platform which has a protective railing all around it and a floor part, and which can be connected to the traverse, wherein the protective railing consists of four side parts, which extend perpendicularly to one another, and of which two oppositely positioned side parts are arranged each foldably at 180° with respect to the floor part of the work platform, the two remaining side parts being nonfoldable, wherein the foldable side parts have outer supports, which are used for securement on the traverse, wherein the foldable side parts lie in a transport position one above the other and parallel to the floor part of the work platform, wherein the nonfoldable side parts are designed as frames and are held in transport position under the side parts, which are folded on one another, and wherein the nonfoldable side parts, which are designed as a frame, can be mounted for the assembly of the platform vertically on securing points of an outer support of the foldable side parts.

2. The device according to claim 1, wherein snap closures are provided on the securing points.

3. The device according to claim 1, wherein the mounting for the apparatus can be mounted on one of the side parts designed as a frame.

4. The device according to claim 1, wherein the seat with a securing support is secured on a side part designed as a frame.

5. The device according to claim 1, wherein one of the foldable side parts has a door for entry by the operator.

6. The device according to claim 5, wherein a rope ladder and a safety rope, which can be rolled up and is locked with a pawl, is provided on the side part with the door for the operator and can be suspended in the area of the sidewall, which area faces the traverse.

* * * * *